(12) United States Patent
Levin

(10) Patent No.: US 11,050,103 B2
(45) Date of Patent: Jun. 29, 2021

(54) POUCH CELL AND METHOD OF FORMING SAME

(71) Applicant: Robert Bosch GmbH, Stuttgart (DE)

(72) Inventor: Eugene Levin, Rochester Hills, MI (US)

(73) Assignees: Robert Bosch Battery Systems LLC, Orion, MI (US); Robert Bosch GmbH, Stuttgart (DE)

(*) Notice: Subject to any disclaimer, the term of this patent is extended or adjusted under 35 U.S.C. 154(b) by 88 days.

(21) Appl. No.: 16/506,260

(22) Filed: Jul. 9, 2019

(65) Prior Publication Data

US 2019/0334131 A1   Oct. 31, 2019

Related U.S. Application Data

(62) Division of application No. 15/622,885, filed on Jun. 14, 2017.

(51) Int. Cl.
*H01M 50/124* (2021.01)
*B21D 22/20* (2006.01)
(Continued)

(52) U.S. Cl.
CPC ........ *H01M 50/124* (2021.01); *B21D 22/203* (2013.01); *B29C 43/14* (2013.01); *B29C 51/267* (2013.01); *H01M 50/10* (2021.01); *H01M 50/116* (2021.01); *B29C 51/082* (2013.01); *B29C 65/02* (2013.01); *B29C 66/1312* (2013.01); *B29C 66/54* (2013.01); *B29C 66/71* (2013.01); *B29C 66/72321* (2013.01);
(Continued)

(58) Field of Classification Search
CPC ......... H01M 50/124; B29L 2031/7146; B21D 22/203; B29C 51/267; B29C 51/082
See application file for complete search history.

(56) References Cited

U.S. PATENT DOCUMENTS

| 8,492,025 B2 | 7/2013 | Lee |
| 2004/0048149 A1 | 3/2004 | Gross et al. |
| 2016/0093837 A1 | 3/2016 | Bushnell et al. |

FOREIGN PATENT DOCUMENTS

| JP | 2008243410 | * 10/2008 |
| JP | 2008243410 A | * 10/2008 |

(Continued)

*Primary Examiner* — Ula C Ruddock
*Assistant Examiner* — Thomas H. Parsons
(74) *Attorney, Agent, or Firm* — Kelly McGlashen; Maginot, Moore & Beck LLP

(57) ABSTRACT

An electrochemical cell includes a housing, and an electrode assembly disposed in the housing. The electrode assembly comprises a positive electrode, a negative electrode and a separator disposed between the positive electrode and the negative electrode. The housing is formed of a first case half and a second case half. Each case half is formed of a metal foil laminate material and includes a wedge-shaped central recess that is surrounded by a flange. The flange of the first case half is joined to the flange of the second case half along a seal line that surrounds the respective central recesses. The central recesses cooperate to define an interior space of the housing that contains the electrode assembly, and the interior space has the shape of a rectangular prism. The seal line extends along a diagonal of a side of the rectangular prism. A method of forming the housing is described.

7 Claims, 8 Drawing Sheets

(51) Int. Cl.
    *B29C 43/14*     (2006.01)
    *B29C 51/26*     (2006.01)
    *H01M 50/10*     (2021.01)
    *H01M 50/116*     (2021.01)
    B29C 65/02     (2006.01)
    B29L 9/00     (2006.01)
    B29L 31/00     (2006.01)
    B29K 23/00     (2006.01)
    B29C 65/00     (2006.01)
    B29K 705/02     (2006.01)
    B29C 51/08     (2006.01)
    B29L 31/34     (2006.01)
    H01M 50/103     (2021.01)

(52) U.S. Cl.
    CPC ...... *B29K 2023/06* (2013.01); *B29K 2023/12* (2013.01); *B29K 2705/02* (2013.01); *B29L 2009/003* (2013.01); *B29L 2031/3468* (2013.01); *B29L 2031/7146* (2013.01); *H01M 50/103* (2021.01)

(56) References Cited

FOREIGN PATENT DOCUMENTS

| | | |
|---|---|---|
| JP | 2013157172 | 8/2013 |
| KR | 20090062795 | 6/2009 |
| KR | 100946835 | 3/2010 |
| KR | 20120051424 | 5/2012 |

\* cited by examiner

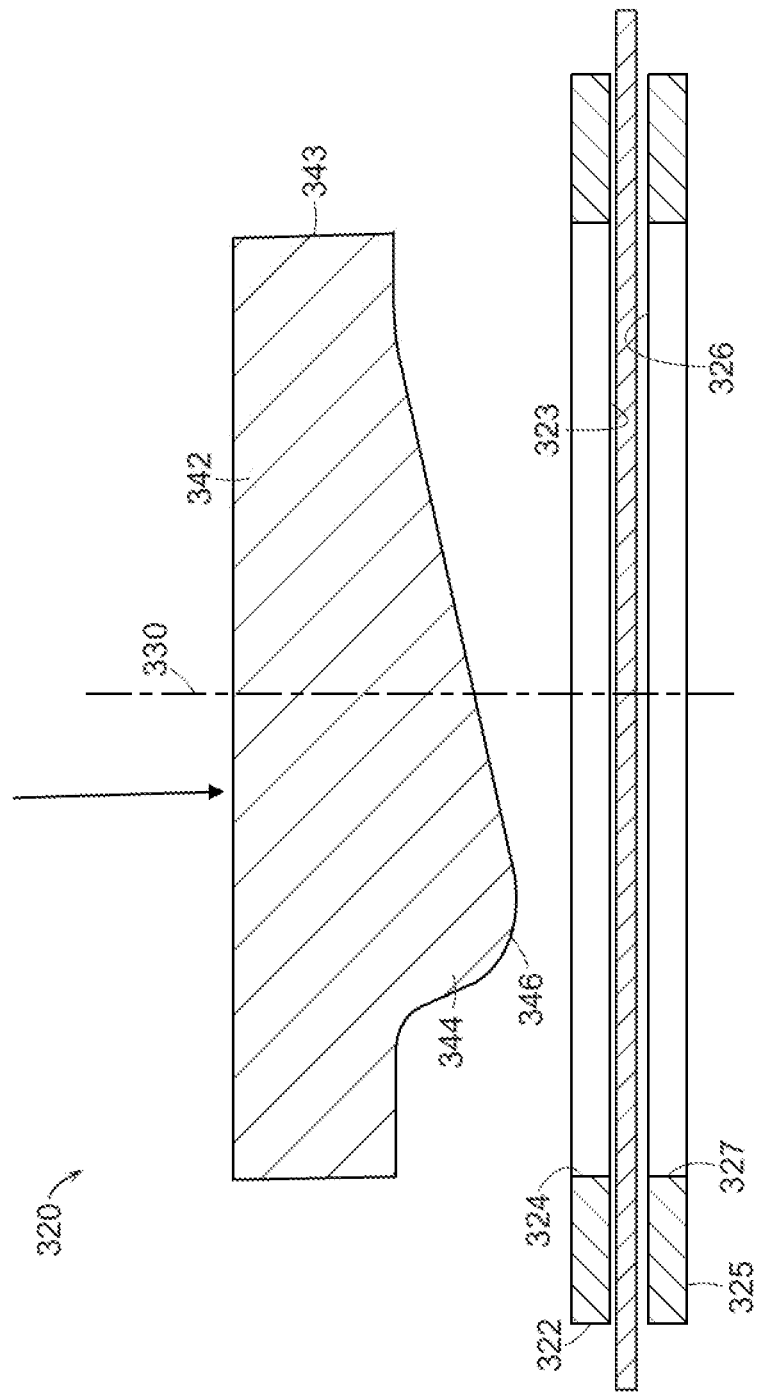

POUCH CELL AND METHOD OF FORMING SAME

CROSS-REFERENCE TO RELATED APPLICATIONS

The present application is a divisional of U.S. patent application Ser. No. 15/622,855 entitled "Pouch Cell and Method of Forming Same", filed Jun. 14, 2017, which is hereby incorporated by reference in its entirety for all purposes.

BACKGROUND

Lithium-ion battery cells are provided in various cell types that address the space requirements of a very wide variety of installation situations, and the most common types used in automobiles are cylindrical cells, prismatic cells, and pouch cells. The cells of different types each have substantially the same internal construction, including an anode, a cathode, a separator membrane that separates the cathode space from the anode space, an electrolyte/solvent, and lithium source, but they can differ appreciably in terms of their general dimensions, cell housing, and volumetric energy efficiency.

With respect to the cell housing, for example, the cylindrical cells and prismatic cells each typically have a rigid housing, usually made of metal or plastic, whereas the pouch cell is surrounded only by a flexible outer envelope made of a metal laminated film material which seals off the actual battery space from the environment. Pouch cell housings may be formed using a drawing process which produces tray-like case halves that are subsequently sealed together. However, the maximum draw depth of the metal laminated film used to form the pouch cell is limited by the material properties of the metal layer of the metal laminated film. For example, some aluminum laminated film materials have a maximum draw depth of about 6 mm to 8 mm, and drawing to greater depths can result in tearing of the aluminum layer in the corners of the case half due to material overstress and stretching in this region. The forming process including the drawing step thus limits the overall height of the pouch cell that can be formed to about 12 mm to 16 mm, where a cell height h of 16 mm is obtained by sandwiching the active material between two drawn films, where the cell height h corresponds to the draw direction of the material used to form the pouch. This height limit in turn limits the amount of active material that can be stored within the pouch cell. Such conventional pouch cells having drawn cell housings are typically formed with plates having a large area (e.g., length and width dimensions) to achieve acceptable energy outputs. That is, the aspect ratio of cell height to length or width is very small (for example, less than 0.1). In order to form battery pouch cells having a greater power storage capacity, it is desirable to form pouch cells having a greater overall height.

SUMMARY

In some aspects, an electrochemical cell includes a housing, and an electrode assembly that is disposed in the housing. The electrode assembly includes a positive electrode, a negative electrode and a separator disposed between the positive electrode and the negative electrode. The positive electrode, the separator and the negative electrode are stacked along a stack axis. The housing includes a first case half and a second case half. The first case half is formed of a metal foil laminate material and includes a first central recess that is surrounded by a first flange. The second case half is formed of the metal foil laminate material and includes a second central recess that is surrounded by a second flange. The first flange is joined to the second flange along a seal line that surrounds the first central recess and the second central recess. The first recess and the second recess cooperate to define an interior space of the housing. The interior space has the shape of a rectangular prism and contains the electrode assembly. The seal line extends along a diagonal of a side of the rectangular prism.

In some embodiments, the first case half is formed such that the first central recess defines a first wedge shaped volume, and the second case half is formed such that the second central recess defines a second wedge shaped volume.

In some embodiments, the stack axis extends in a direction that is parallel to the side of the rectangular prism.

In some embodiments, the first central recess and the second central recess each have a triangular shape when the first and second case halves are viewed in a first direction that is perpendicular to the stack axis. In addition, the first central recess and the second central recess each have a rectangular shape when the first and second case halves are viewed in a second direction that is perpendicular to the stack axis and to the first direction.

In some embodiments, the rectangular prism includes a first end that is transverse to the stack axis, and a second end parallel to, and spaced apart from, the first end. The rectangular prism includes a first side, a second side, a third side and a fourth side that are parallel to, and spaced apart from, the stack axis. The first side, the second side, the third side and the fourth sides extend between and join the first end to the second end, and the seal line extends along a diagonal of the second side and the fourth side.

In some embodiments, when in use, the electrochemical cell is supported on one of the first side and the third side. In addition, a portion of the first flange and the second flange including the seal line that protrudes from the one of the first side and the third side is folded so as to be aligned with the one of the first side and the third side.

In some embodiments, the metal foil laminate material includes a metal foil layer sandwiched between polymer layers.

In some aspects, a method of forming a housing includes the following method steps: Providing a first sheet of a metal foil laminate material; clamping the first sheet between a first clamping surface of a first clamp element and a second clamping surface of a second clamp element, the first clamp element having a first central opening formed in the first clamping surface and the second clamp element having a second central opening formed in the second clamping surface, the first central opening and the second central opening being aligned along a clamping axis that is perpendicular to both the first clamping surface and the second clamping surface; providing a first punch that comprises a first base configured to be connected to an actuator, and a first protrusion that protrudes from the first base and has the shape of a right triangular prism, the first protrusion including two first vertices that are spaced apart from the first base and form a leading edge of the first protrusion, each of the two first vertices having a first radius; deforming the first sheet of material by pressing the first punch through the first central opening and the second central opening and against the first sheet to form a wedge shaped recess in the first sheet having recess vertices that have a radius corresponding to the first radius; providing a second punch that comprises a second base configured to be connected to an actuator, and a second protrusion that protrudes from the second base and has the shape of a right triangular prism, the second protrusion including two second vertices that are spaced apart from the second base and form a leading edge of the second protrusion, each of the two second vertices having a second radius that is smaller than the first radius; and deforming the wedge shaped recess by pressing the second punch through the first central opening and the second central opening and against the first sheet to deform the wedge shaped recess such that the recess vertices have a radius corresponding to the second radius, whereby a first case half is formed that includes the wedge shaped recess and a first flange that surrounds the wedge shaped recess and protrudes outwardly therefrom.

In some embodiments, the method includes the following method steps: Providing a second sheet of a metal foil laminate material; clamping the second sheet between the first clamping surface of the first clamp element and the second clamping surface of the second clamp element; deforming the second sheet of material by pressing the first punch through the first central opening and the second central opening and against the second sheet to form a wedge shaped recess in the second sheet having recess vertices that have a radius corresponding to the first radius; and deforming the wedge shaped recess by pressing the second punch through the first central opening and the second central opening and against the second sheet to deform the wedge shaped recess such that the recess vertices have a radius corresponding to the second radius, whereby a second case half is formed that includes the wedge shaped recess and a second flange that surrounds the wedge shaped recess and protrudes outwardly therefrom.

In some embodiments, the method includes the following method steps: Assembling the first sheet and second sheet together such that wedge shaped recess of the of the first sheet cooperates with the wedge shaped recess of the second sheet to form the housing having an interior space that has the shape of a rectangular prism, and sealing the first flange to the second flange along a seal line that surrounds both the wedge shaped recess of the of the first sheet and the wedge shaped recess of the second sheet, whereby the seal line extends along a diagonal of a side of the rectangular prism.

In some embodiments, the step of sealing the first flange to the second flange is performed by applying heat to at least one of the first and second flanges.

In some embodiments, the first clamp element and the second clamp element are clamped together using a clamping force applied along the clamping axis that is sufficient to retain the first sheet between the first clamp element and the second clamp element during the deforming step, while also allowing the first sheet to slide relative to the first clamping surface and the second clamping surface.

In some embodiments, the first radius is at least 10 mm and the second radius is at most 4 mm.

In some embodiments, the first radius is in a range of 10 mm to 15 mm, and the second radius is in a range of 1 mm to 4 mm.

A robust pouch cell forming device and method are used to provide a battery cell having a pouch cell housing formed of an aluminum laminated film that is formed into a wedge-shaped case-half without stretch and overstress in the corners of the case half. As a result, a pouch cell can be provided having a greater overall depth than a pouch cell formed by some conventional drawing methods. For example, an aluminum laminated film may be formed into a wedge-shaped case-half having a depth that is greater than 10 mm to provide a pouch cell having a height of greater than 20 mm. The maximum draw depth of the case half is a function of at least the overall size of the wedge being formed. For example, for a wedge having a 150 mm length and a 75 mm width, the aluminum laminated film can be formed into a wedge shaped case half having a height of about 35 mm. Without being bound by theory, it is assumed that the relatively greater draw depth for a wedge shaped recess as compared to a rectangular shaped recess is due at least in part to a progressive (e.g., multistage) drawing process described herein, as well as to the wedge shape of the recess. That is, the wedge shape results in fewer vertices being formed in the case half than does the rectangular shape. Since two vertices are formed in the wedge shaped case half as compared to four vertices in the rectangular shaped case half, the metal laminated film used to form the wedge shaped case half can accommodate a deeper draw depth than that of the rectangularly shaped case half.

The progressive drawing process that is used to form a case half having the wedge shaped recess in the metal laminated film is a two-draw drawing process. In the first step, a first punch is used to form an initial recess in a sheet of the metal laminated film. The first punch includes a first protrusion that protrudes from a first base and has the shape of a right triangular prism. The first protrusion includes two first vertices that are spaced apart from the first base and form a leading edge of the first protrusion. Each of the two first vertices have a first radius which provides the wedge shaped recess in the metal laminated film including rounded vertices. In the second step, a second punch is used to further define and refine the shape of the initial recess. The second punch includes a second protrusion that protrudes from a second base and has the shape of a right triangular prism. The second protrusion includes two second vertices that are spaced apart from the second base and form a leading edge of the second protrusion. Each of the two second vertices have a second radius that is smaller than the first radius, whereby the vertices of the wedge shaped recess in the metal laminated film have the appearance of corners. Thus, in the first step, the metal laminated film is stretched using a relatively rounded punch such that stress applied to the material is much less localized than in a conventional pouch drawing process. As a result, material damage including tears due to high stress in sharp corners is avoided. In the second step, since the two second vertices have a relatively small radius, the stretched metal laminate film is further deformed into the desired wedge shape having defined corners.

To assemble a pouch cell using a pair of the progressively drawn sheets, the active materials and separator that form the electrode are disposed in the wedge shaped central recesses in such a way as to be sandwiched between the sheets, and flanges of the sheets that surround the wedge shaped recess are welded together around the circumference the central recess with a heating element to form rectangular pouch cell. Due to the wedge shape of the recess, the flanges lie in a plane that is acutely angled relative to surfaces of the active materials and separator.

The progressive drawing process used to form a case half having the wedge shaped recess is advantageous when compared to some conventional methods of forming pouch cell housings from a metal laminated film that include drawing process. The conventional methods may produce tray-like case halves including a rectangular recess that are subsequently sealed together to form a pouch cell housing. For example, in some conventional pouch cell housings formed of an aluminium laminated film, two identical laminated film sheets each are formed in a single step drawing process to include a rectangular central recess drawn to a depth of approximately 6 mm to 8 mm, and having a planar flange that surrounds the central recess. As previously discussed, drawing to greater depths can result in tearing of the aluminum layer in the corners of the case half due to material overstress and stretching in this region. In contrast, when the above-described progressive drawing process is used to form a case half using the same aluminium laminated film, a draw depth of greater than 20 mm is obtained. In some embodiments, a draw depth of 35 mm is obtained. Moreover, when two case halves formed in the above-described progressive drawing process are assembled together with the wedge shaped recesses cooperating to form a single, rectangularly shaped, closed container, and an electrode assembly is sealed in the container along with an electrolyte, a prismatic (e.g., rectangular) pouch cell is formed. Due to its relatively larger draw depth, the resulting pouch cell has a greater power storage capacity that some conventional pouch cells that are drawn to form recesses having a rectangular shape.

In addition, the pouch cell 2 is formed having a reliable sealed joint 102 between the case halves 41(1), 41(2), where the seal joint 102 extends along a diagonal of a pair of opposed sides of the rectangular housing and along an edge of a second pair of sides of the rectangular housing 40. Since the sealed joint 102 extends along an edge of at least one side 123 of the housing 40, the sealed joint 102 may be bent outward and into alignment with the side 123 of the housing 40. As a result, the side 123 of the pouch cell 2 having the outwardly sealed joint 102 can rest on a cooling plate 30 with the side 123 of the housing 40 in close contact with cooling plate surface 32 (FIG. 5). This can be compared to some conventional pouch cells 200 in which the sealed joint 202 extends circumferentially around the sides of the pouch cell 200 along a line midway between ends 221, 222 of the pouch cell 200. In the conventional configuration, although the sealed joint 202 is bent outward, it overlaps a portion of the side 223 of the rectangular housing 240 on which the cell 200 rests, preventing close contact between the side 223 of the housing 240 the cooling plate surface 32 (FIG. 6). Thus, the pouch cell 2 having the angled sealed joint 102 allows for closer contact between a side 123 of the cell housing 40 and a cooling plate 30 than some conventional cells 200, and thus provides more efficient heat transfer and cell cooling than some conventional cells 200.

BRIEF DESCRIPTION OF THE DRAWINGS

FIG. 8 is a side sectional view of a drawing tool including a first punch in a retracted position and an undeformed sheet of a metal foil laminate material disposed between a pair of clamping elements, where an arrow illustrates the direction of movement of the punch from the retracted position to an advanced position (not shown).

FIG. 9 is a side sectional view of the sheet of metal foil laminate material following deformation by the first punch.

DETAILED DESCRIPTION

Figure 1:
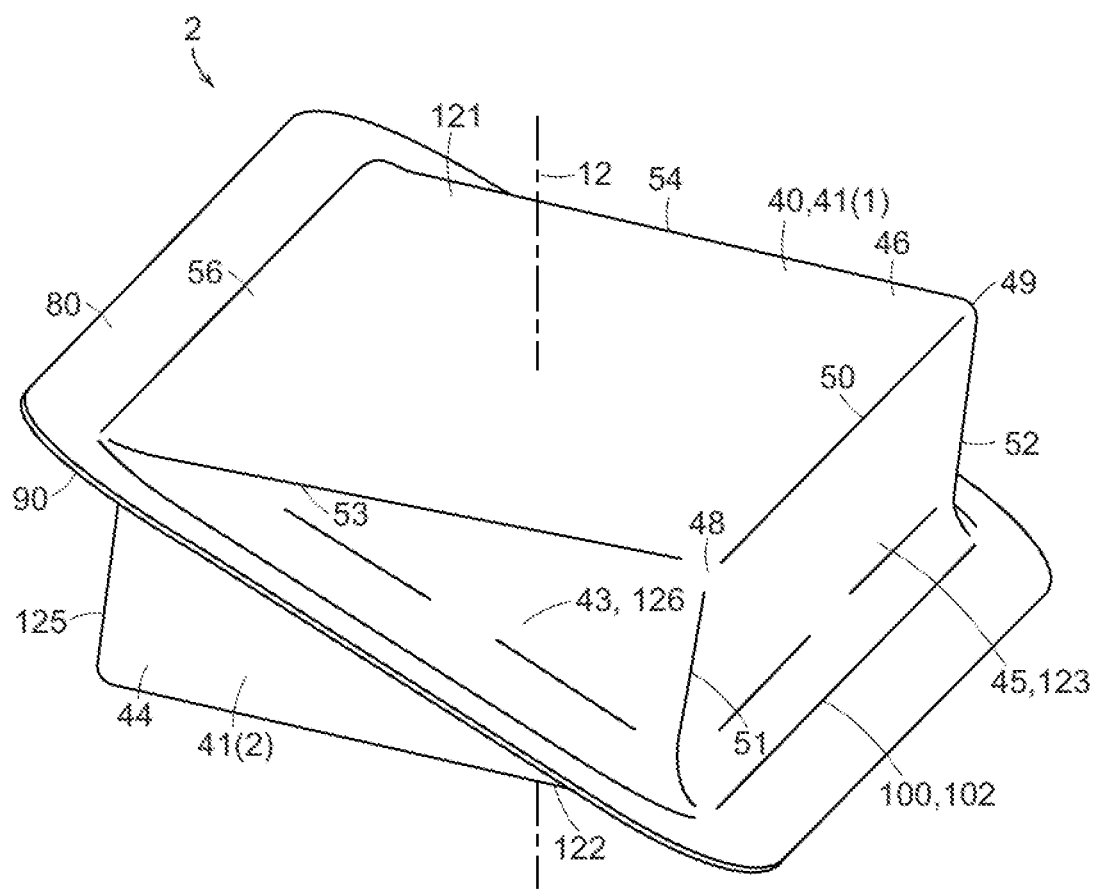
FIG. 1 is a perspective view of the pouch cell having a sealed flange that extends along a diagonal of a side of the cell.
Figure 2:
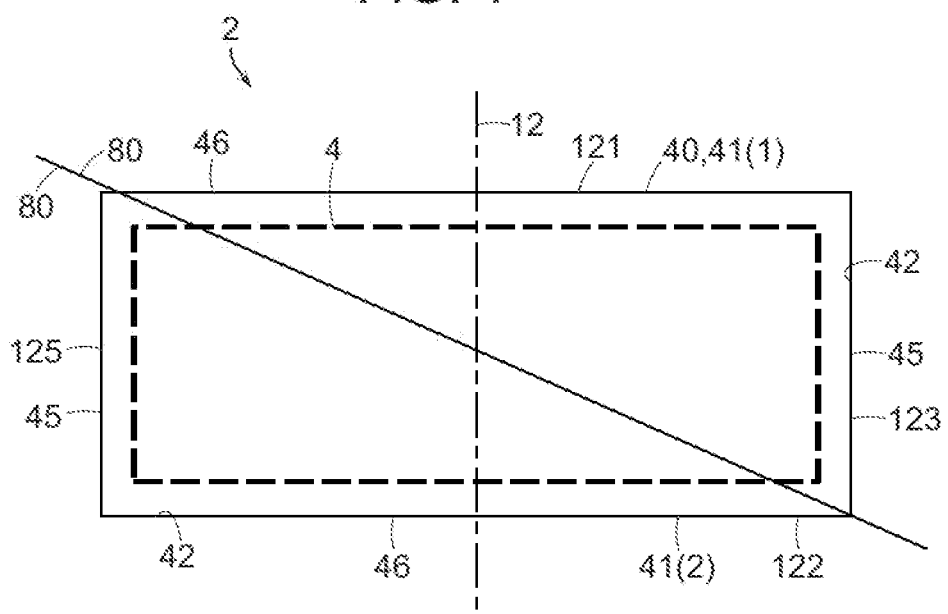
FIG. 2 is a schematic end view of the pouch cell of FIG. 1.
Figure 3:
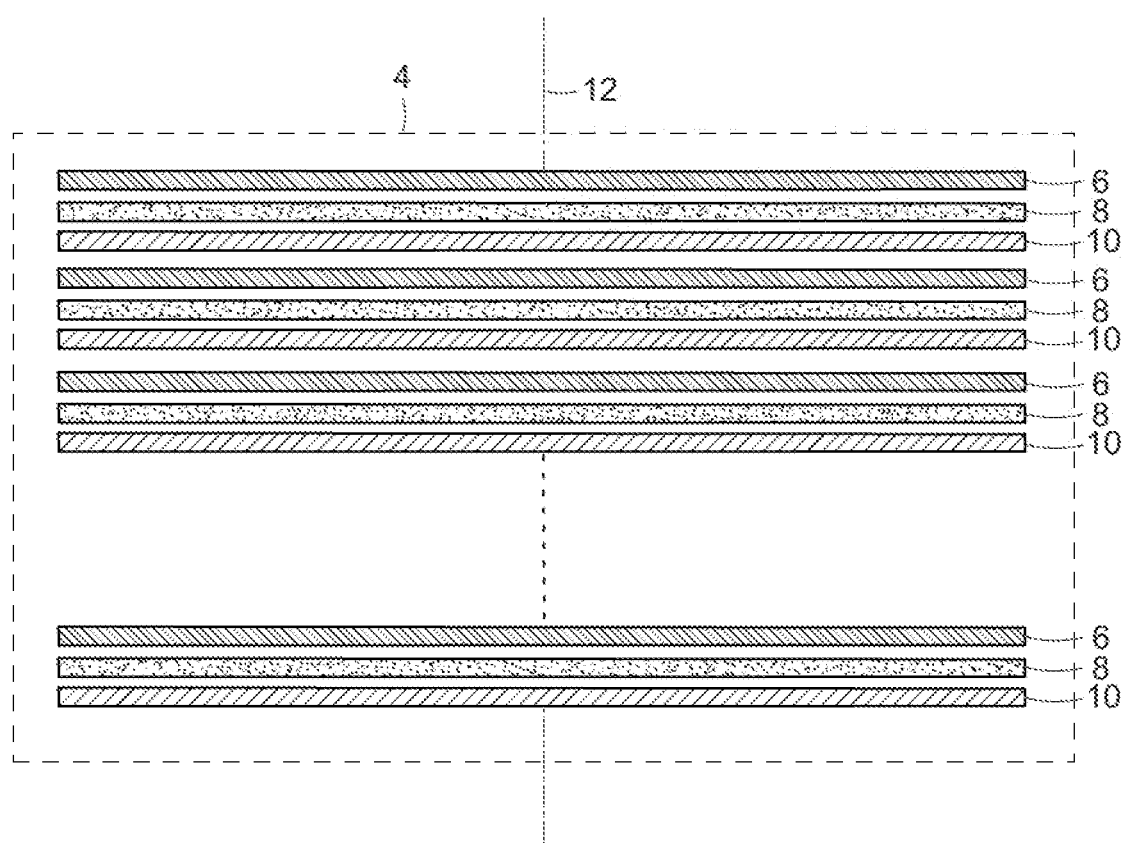
FIG. 3 is a schematic cross sectional view of the electrode assembly of the pouch cell of FIG. 1.

Referring to FIGS. 1-3, a lithium ion electrochemical pouch cell 2 includes a housing 40 and an electrode assembly 4 that is sealed within the housing 40 along with an electrolyte. The housing 40 is an assembly of two case halves 41(1), 41(2) that are formed of a metal foil laminate material. For example, in the illustrated embodiment, the material used to form the housing 40 is a flexible, three-layer, metal laminated film having a polypropylene layer, an aluminium foil layer, and a polyethylene layer. In a progressive forming process described in detail below, the flexible metal foil laminate material is deformed to form the case halves 41(1), 41(2) and the case halves 41(1), 41(2) are welded together to form the pouch cell housing. The case halves 41(1), 41(2) each include a central wedge-shaped recess 42 that is surrounded by a flange 80, and when assembled, the wedge shaped recesses 42 cooperate to form a rectangular housing that receives the electrode assembly 4, as described in detail below.

The electrode assembly 4 comprises at least one positive electrode 6, at least one negative electrode 10 and a separator 8 that is disposed between each pair of the positive electrode 6 and the negative electrode 10. Each of the positive electrodes 6, the negative electrodes 10 and the separators 8 are thin plates, and each of the positive and negative electrodes 6, 10 have a layered structure to facilitate insertion and/or movement of lithium-ions. For example, the positive electrodes 6 may include a first substrate formed of a first electrically-conductive material such as copper, and a first active material such as a graphite coating that is disposed on one or both sides of the first substrate. In addition, negative electrodes 10 may include a second substrate formed of a second electrically-conductive material such as aluminium, and a second active material such as a lithiated metal oxide coating that is disposed on one or both sides of the second substrate. The substrates used to form the positive and negative electrodes 6, 10 are very thin (e.g., having a thickness on the order of about 0.04 to 0.15 mm) compared to the overall cell height (e.g. having a height of about 35 mm) and thus are illustrated schematically and not to scale in the figures.

The separator 8 is a permeable membrane that functions to keep the positive and negative electrodes 6, 10 apart to prevent electrical short circuits while also allowing passage of ionic charge carriers provided in the electrolyte and that are needed to close the circuit during the passage of current within the cell 2. The separator 8 is formed of an electrically insulating material such as a tri-layer polypropylene-polyethylene-polypropylene membrane.

The positive electrodes 6 and negative electrodes 10 are arranged in a stacked or layered configuration in which a separator 8 is disposed (e.g., sandwiched) between each pair of the positive and negative electrodes 6, 10. A stack axis 12 of the electrode assembly 4 extends through a center of the electrode assembly 4 in a direction parallel to the stacking direction. In the stacked configuration, the positive electrodes 6, the negative electrodes 10 and the separators 8 are stacked along the stack axis 12. In some embodiments, the peripheral edges of each of the plates 42, 44, 46 are aligned in a direction parallel to the direction of the stack axis 48 (shown), while in other embodiments, the peripheral edges of the positive electrodes are offset to one side of the stack axis 12, while the peripheral edges of the negative electrodes 10 are offset to an opposed side of the stack axis 12 (not shown). The particular alignment of the peripheral edges facilitates connection of the electrodes 6, 10 to respective terminals (not shown) of the cell 2, and is determined based on whether current collectors are used, and the type of current collector used.

Figure 4:
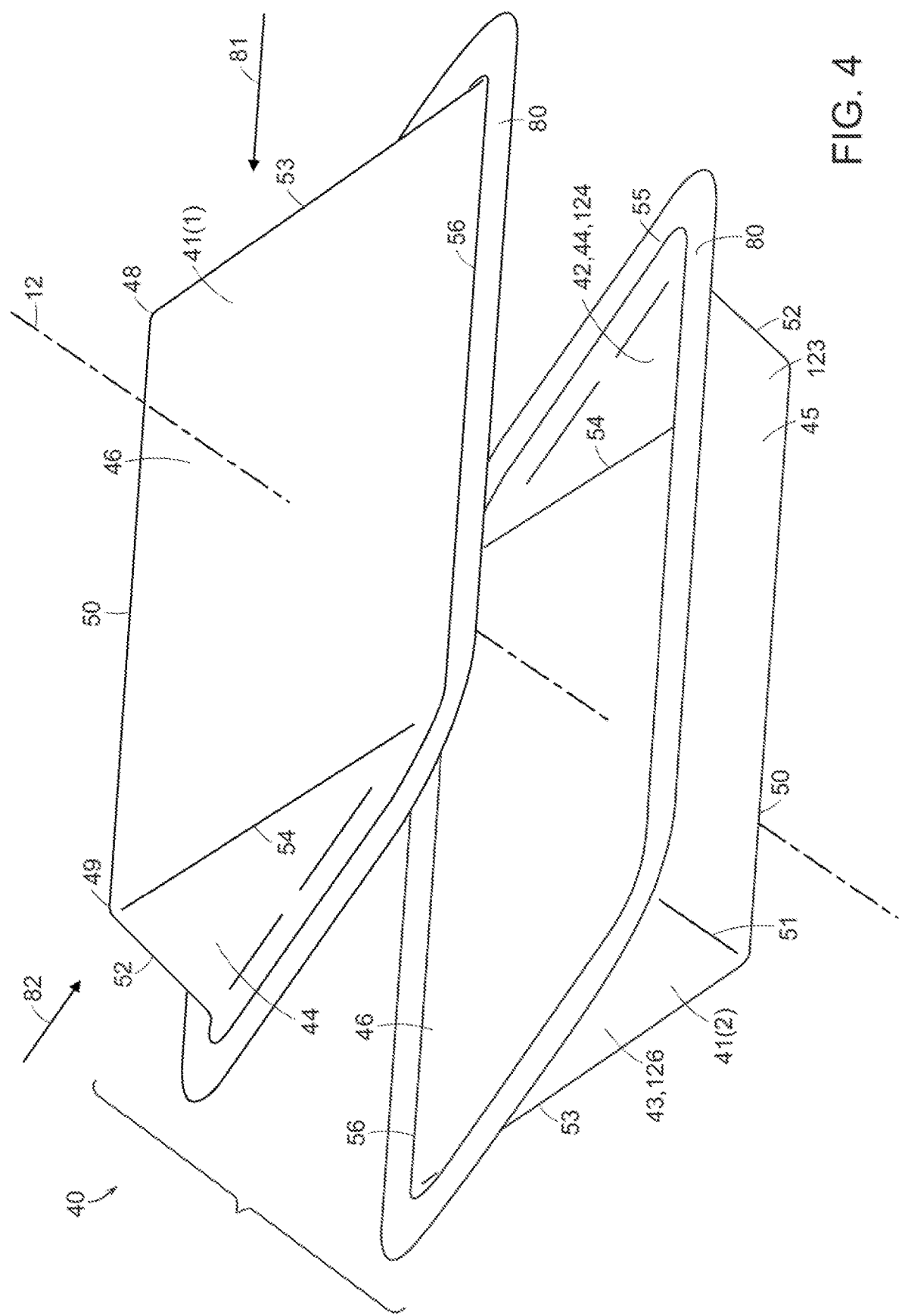
FIG. 4 is an exploded view of the pouch cell housing.

Referring to FIGS. 1 and 4, a first case half 41(1) and a second case half 41(2) are assembled and welded together to form the cell housing 40. The first and second case halves 41(1), 41(2) are identical, and thus only the first case half 41(1) will be described, and common reference numbers will be used to refer to common elements. The first case half 41(1) includes a central recess 42 that is surrounded by a flange 80 that surrounds the central recess 42. The central recess 42 has the shape of a right triangular prism, whereby the central recess 42 defines a first wedge shaped volume. The central recess 42 includes a first base 43, a second base 44 that is parallel to, and spaced apart from, the first base 43. The first and second bases 43, 44 each have the shape of a right triangle. The first and second bases 43, 44 are each joined to the flange 80 along an edge corresponding to the hypotenuse of the right triangle. The central recess 42 further includes a first lateral face 45 and a second lateral face 46. The first lateral face 45 is perpendicular to the second lateral face 46, and is joined to the second lateral face along an apex edge 50. The apex edge 50 extends between the two vertices 48, 49 of the wedge shaped central recess 42. The apex edge 50 corresponds to the portion of the central recess 42 that is furthest from the flange 80, and extends in parallel to a plane defined by the flange 80. In addition, the first lateral face 45 is joined to the first base 43 along the first short edge 51, and is joined to the second base 44 along the second short edge 52. The second lateral face 46 is joined to the first base 43 along the first long edge 53, and is joined to the second base 44 along the second long edge 54. The first base 43, the second base 44, the first lateral face 45 and the second lateral face 46 are each joined to the flange 80 along an opening edge 55 that defines the rectangular opening of the central recess 42.

The central recess 42 has a triangular shape when the first case half 41(1) is viewed in a first direction 81 that is perpendicular to the stack axis 12, and has a rectangular shape when the first case half is viewed in a second direction 82 that is perpendicular to the stack axis 12 and to the first direction 81.

When the first case half 41(1) is assembled together with the second case half 41(2), the central recess 42 of the first case half 41(1) faces and cooperates with the central recess 42 of the second case half 41(2) to form the electrochemical cell housing 40. The housing 40 has the shape of a rectangular prism and receives the electrode assembly 4 therein. In particular, the housing 40 includes a first end 121 that is perpendicular to the stack axis 12, and a second end 122 that is parallel to, and spaced apart from, the first end 121. The first end 121 of the housing 40 corresponds to the second lateral face 46 of the central recess 42 of the first case half 41(1), and the second end 122 of the housing 40 corresponds to the second lateral face 46 of the central recess 42 of the second case half 41(2).

The cell housing 40 further includes a first side 123, a second side 124, a third side 125 and a fourth side 126 that are parallel to, and spaced apart from, the stack axis 12, and are joined edge-to-edge to form a housing sidewall defining a closed rectangular section that surrounds the stack axis 12. The first, second, third and fourth sides 123, 124, 125, 126 extend between and join the housing first end 121 to the housing second end 122. The first side 123 of the housing 40 corresponds to the first lateral face 45 of the first case half 41, and the third side 125 of the housing 40 corresponds to the first lateral face 45 of the second case half 61. In addition, the second side 124 of the housing 40 corresponds to the second base 44 of the first case half 41 and the first base 43 of the second case half 61. In addition, the fourth side 126 of the housing 40 corresponds to the first base 43 of the first case half 41 and the second base 44 of the second case half 61.

When the first case half 41 is assembled together with the second case half 61, the flange 80 of the first case half 41 abuts the flange 80 of the second case half. The flange 80(1) of the first case half 41 is joined to the flange 80(2) of the second case half 61 along a seal line that surrounds the central recesses 42(1), 42(2), for example by application of heat to the metal foil laminate material, to form a sealed joint 102. In some embodiments, the seal line 100 (and thus also the sealed joint 102), extends along a diagonal of the second and fourth sides 124, 126 of the cell housing 40. In addition, the seal line 100 (and thus also the sealed joint 102), extends along a trailing edge 56 of each of the central recesses 42(1), 42(2) corresponding to the intersection of the second lateral face 46 and the flange 80 of each respective case half 41, 61. The trailing edge 56 is a portion of the opening edge 55 that defines the rectangular opening of the central recess 42.

In the illustrated embodiment, the cell housing 40 has a rectangular shape, and includes a first case half 41 and a second case half 61 that is joined to the case half 41 along a sealed joint 102 that extends along a diagonal of the cell housing 40. The electrode assembly 4 is disposed in the cell housing 40 such that the stack axis 12 is perpendicular to the two ends 121, 122 of the cell housing 40, and the diagonally extending portion of the sealed joint 102 is at an acute angle relative to the stack axis.

Figure 5:
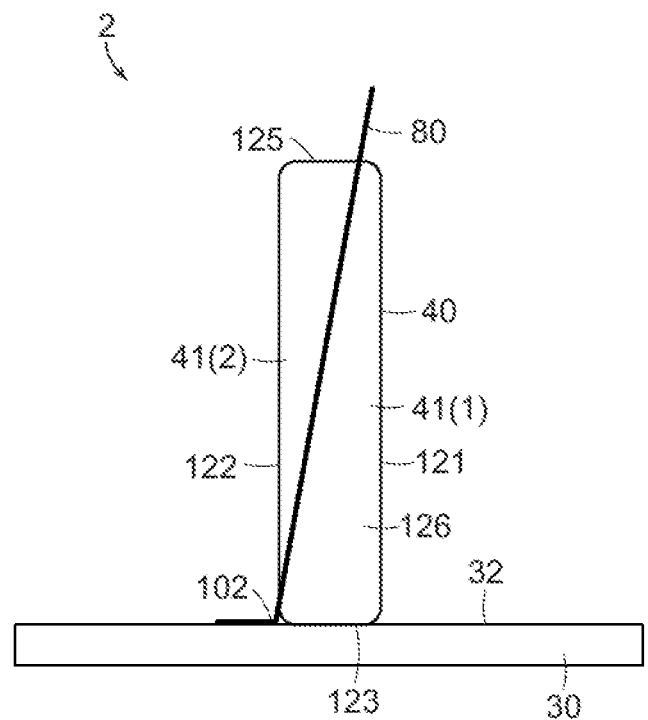
FIG. 5 is an end view of the pouch cell of FIG. 1 resting on a cooling plate.
Figure 6:
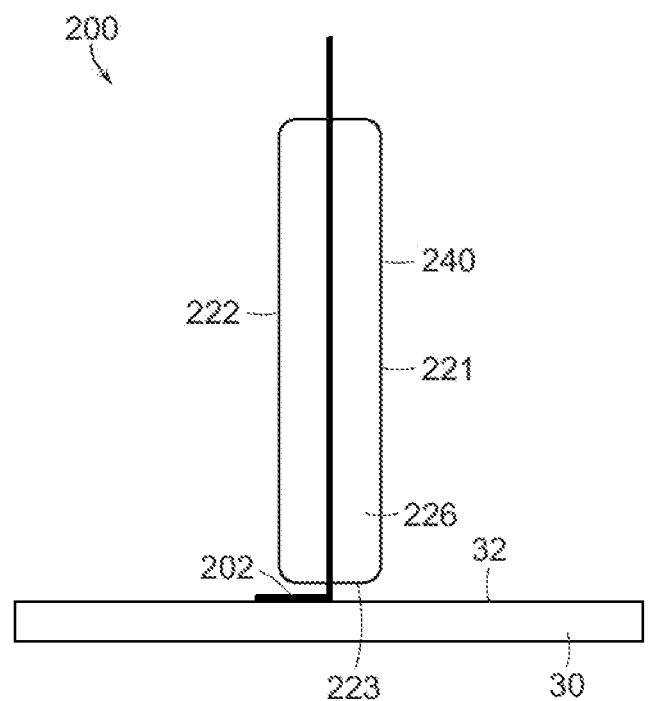
FIG. 6 is an end view of a conventional pouch cell resting on a cooling plate.
Figure 7:
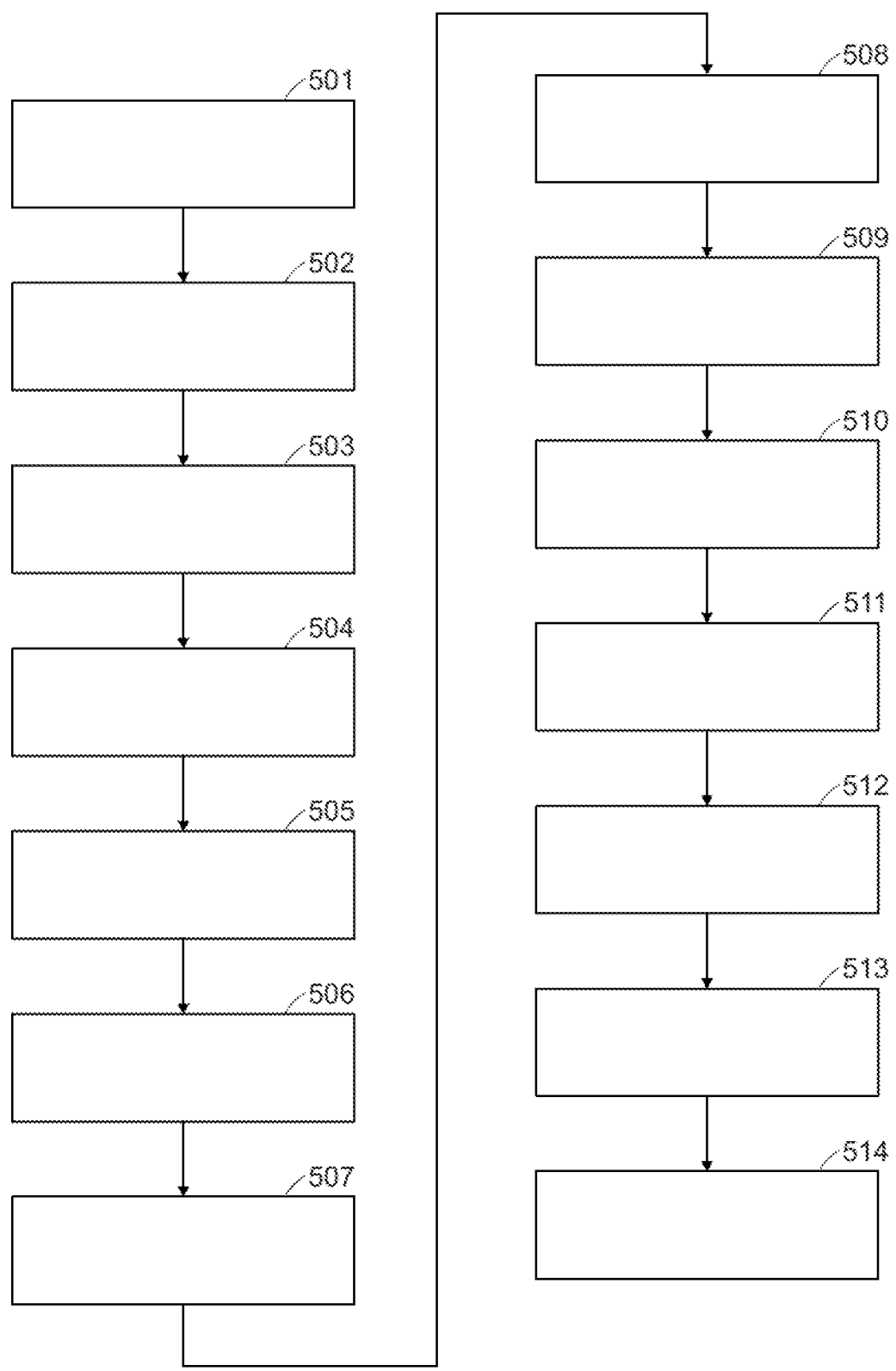
FIG. 7 is a flow chart illustrating a method of forming a housing.

Referring to FIG. 5, in some applications, the electrochemical cell 2 may be supported on a cooling plate 30 that facilitates control of the temperature of the cell 2. In such applications, the cell 2 is supported on one or the other of the first side 123 and the third side 125 of the housing 40. For example, in the embodiment illustrated in FIG. 5, the cell 2 is supported on the first side 123. This is possible because the flange 80 including the sealed joint 102 that borders the first side 123 is disposed along the trailing edge 56 of the central recess 42. In addition, the portion of the flange 80 including the sealed joint 102 that extends along the trailing edge 56 is folded outward away from the first side 123 so as to be aligned with the first side 123. As a result, the first side 123 can rest on the cooling plate 30 with the first side in close contact with cooling plate surface 32 without interference from the sealed joint 102. This provides more efficient cell cooling as compared to some conventional pouch cells 200 in which the flange 280 and seal joint 202 extend along a side 223 of the housing 240 at a location spaced apart from the ends of the housing 240 (FIG. 6).

Referring to FIGS. 7-13, a method of manufacturing a housing, for example the pouch-type housing 40 for an electrochemical cell 2, from two portions of sheet material will now be described.

In an initial step (step 501), a first sheet 301 of a metal foil laminate material is provided. In the illustrated embodiment, the material is a flexible, three-layer, metal laminated film having a polypropylene layer, an aluminium foil layer, and a polyethylene layer. However, it is understood that the material is not limited to this construction.

The first sheet 301 is secured within a forming device 320 in a generally planar configuration, for example by clamping the first sheet 301 between the clamp elements 322, 325 of a forming device 320 (step 502). The forming device 320 includes the clamp elements 322, 325, an actuator (not shown) that is configured to be connected to and move a punch relative to the clamp elements 322, 325, and interchangeable punches 342, 362, that are moved by the actuator relative to the clamp elements 322, 325.

In the securing step, the first sheet 301 is disposed between a first clamping surface 323 of the first clamp element 322 and a second clamping surface 326 of the second clamp element 325. In applications where the first sheet 301 is formed of a metal foil that is sandwiched between a polypropylene layer and a polyethylene layer, the polypropylene layer is arranged to face the punch.

The first clamp element 322 has a first central opening 324 formed in the first clamping surface 323, and the second clamp element 325 has a second central opening 327 formed in the second clamping surface 326. In the forming device 320, the first and second clamp elements 322, 325 are arranged such that the first clamping surface 323 is parallel to and faces the second clamping surface 326. In addition, the first central opening 324 and the second central opening 327 are aligned along a clamping axis 330 that is perpendicular to both the first and the second clamping surfaces 323, 326.

The first clamp element 322 and the second clamp element 325 are clamped together using a clamping force applied in parallel to the clamping axis 330 that is sufficient to retain the first sheet 301 between the first clamp element 322 and the second clamp element 325 during the subsequent deforming steps, while also allowing the first sheet 301 to slide relative to the first clamping surface 323 and the second clamping surface 326. This feature reduces stresses within the first sheet 301 during deformation.

Following the step of securing the first sheet 301 between the clamp elements 322, 325, a first punch 342 is provided by connecting it to the actuator (step 503). The first punch 342 includes a first base 343 configured to be connected to the actuator, and a first protrusion 344 that protrudes from a clamp element-facing side of the first base 343. The first protrusion 344 has the shape of a right triangular prism, and includes only two first vertices 346, 348 that are spaced apart from the first base 343. A line connecting the two first vertices 346, 348 forms a leading edge of the first protrusion 344 during punching operations. In addition, the profile of the first protrusion 344 has blunted or rounded edges and corners to minimize stress in the material being punched. To this end, each of the two first vertices 346, 348 have a first radius R1 that is relatively large such that the first vertices appear rounded. For example, in some embodiments, the first radius R1 may be in a range of 10 mm to 15 mm. In the illustrated embodiment, the second radius R2 is 15 mm.

As a result of this step, the first punch 342 is positioned in a first, retracted position in which the first punch is aligned with the first and second central openings 324, 327 and is disposed at a position spaced apart from the first sheet 301 with the first protrusion facing the first sheet 301 (FIG. 8).

Figure 10:
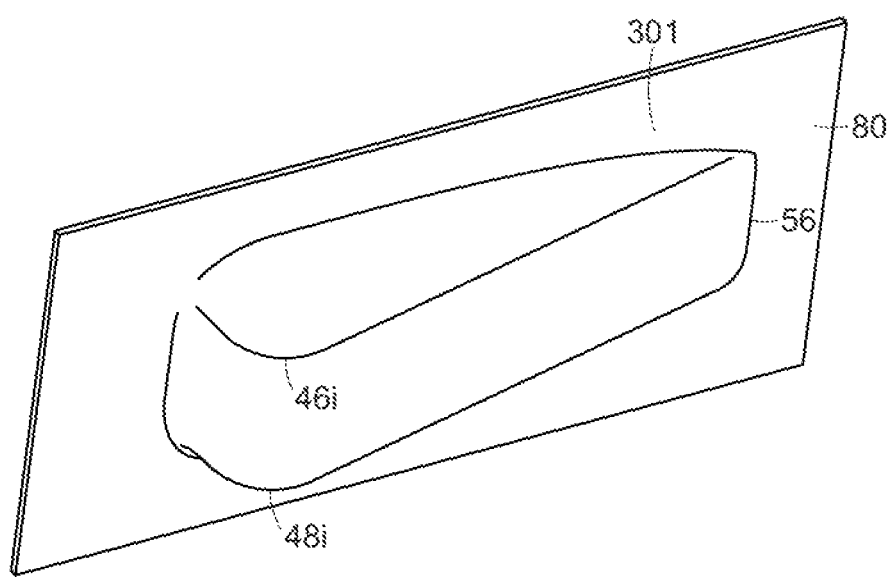
FIG. 10 is a perspective view of the sheet of metal foil laminate material following deformation by the first punch.

In a first step of a two-step (progressive) forming process, the forming device 320 is then moved from the retracted position to a second, advanced position (step 504). In particular, the first punch 34 is pressed against the first sheet 301 by passing the first punch 342 through the first and second central openings 324, 327. As a result, the first sheet 301 is deformed to include a wedge shaped initial recess 42$i$ that is surrounded by the flange 80. The initial recess 42$i$ has the shape of the first protrusion 344, and thus has blunted or rounded edges and corners. In particular, the initial recess 42$i$ has initial recess vertices 46$i$, 48$i$ that have a radius corresponding to the first radius R1 (FIGS. 9 and 10). After the initial recess 42$i$ is formed, the forming device 320 is moved from the second, advanced position to the first, retracted position.

Following the step of deforming the first sheet 301 to form the initial recess 42$i$, a second punch 362 is provided by connecting it to the actuator (step 505). The second punch 362 includes a second base 363 configured to be connected to the actuator, and a second protrusion 364 that protrudes from a clamp element-facing side of the second base 363. The second protrusion 364 has the shape of aright trianniar, prism, and includes only two second vertices 366, 368 that are spaced apart from the second base 363. A line connecting the two second vertices 366, 368 forms a leading edge of the second protrusion 364 during punching operations. In contrast to the profile of the first protrusion 344, the profile of the second protrusion 364 has relatively sharp edges and corners to provide the desired polygonal shape in the material being punched. To this end, each of the two second vertices 366, 368 have a second radius R2 that is small relative to R1 such that the second vertices 366, 368 are relatively sharp and squared off. For example, in some embodiments, the second radius R2 may be in a range of 1 mm to 4 mm. In the illustrated embodiment, the second radius R2 is 3 mm.

Figure 11:
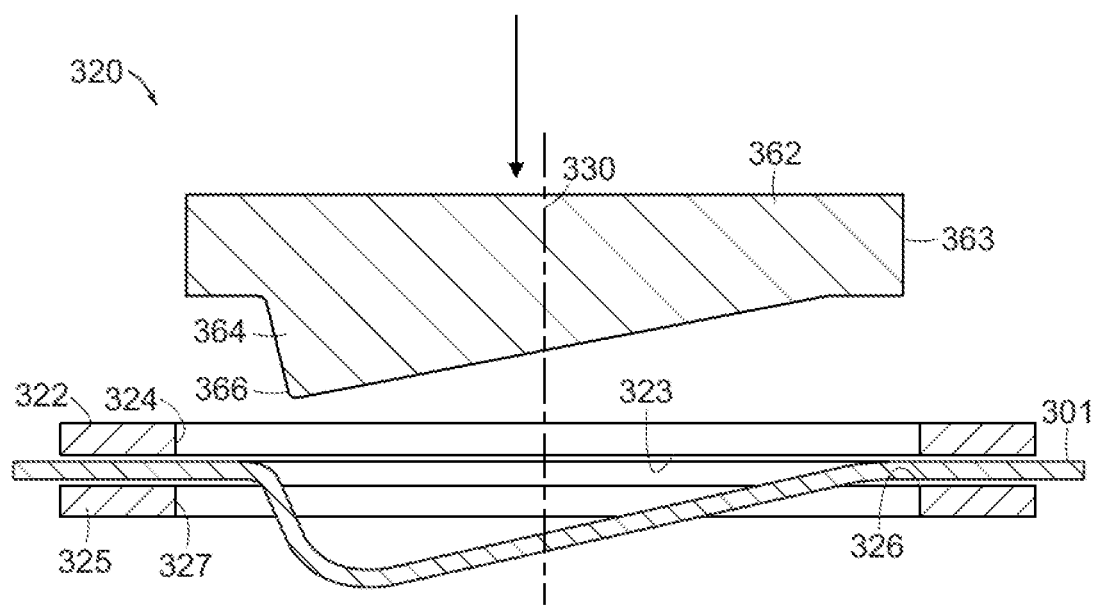
FIG. 11 is a side sectional view of the drawing tool including a second punch in a retracted position and a deformed sheet of a metal foil laminate material disposed between the pair of clamping elements, where an arrow illustrates the direction of movement of the punch from the retracted position to an advanced position (not shown).

As a result of this step, the second, punch 362 is positioned in the retracted position in which the second punch is aligned with the first and second central openings 324, 327 and is disposed at a position spaced apart from the first sheet 301 with the second protrusion facing the first sheet 301 (FIG. 11).

Figure 12:
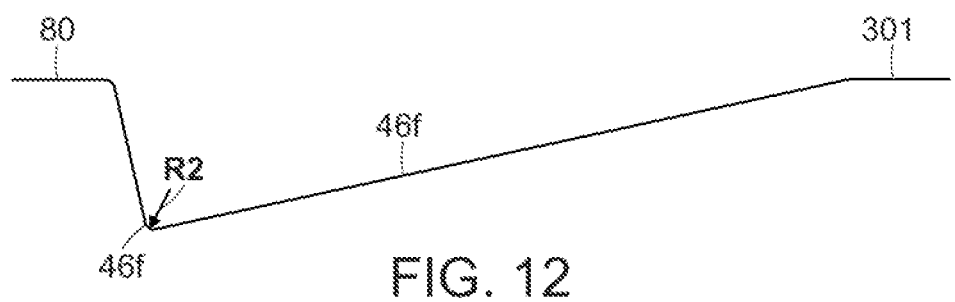
FIG. 12 is a side sectional view of the sheet of metal foil laminate material following deformation by the second punch.
Figure 13:
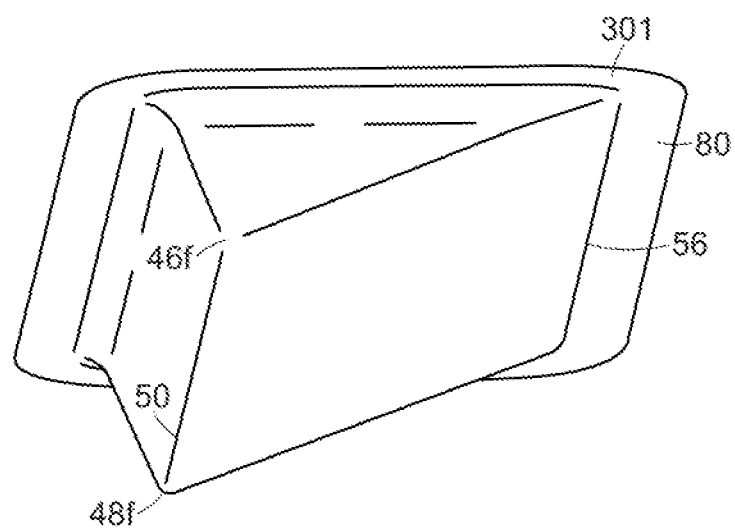
FIG. 13 is a perspective view of the sheet of metal foil laminate material following deformation by the second punch.

In a second step of the two-step (progressive) forming process, the forming device 320 is again moved from the retracted position to the advanced position (step 506). As a result, the second punch 362 is passed through the first and second central openings 324, 327 and pressed against the first sheet 301, further deforming the initial recess 42$i$ to form a wedge shaped final recess 42$f$. The final recess 42$f$ has the shape of the second protrusion 364, and thus has relatively sharp edges and corners. In particular, the final recess 42$f$ has final recess vertices 46$f$, 48$f$ that have a radius corresponding to the second radius R2 (FIGS. 12 and 13).

As a result, the first case half 41(1) is formed that includes the wedge shaped recess 42 and, the flange 80 that surrounds the wedge shaped recess 42 and protrudes outwardly therefrom.

Following formation of the first case half 41(1), steps 501-506 are repeated to form the second case half 41(1). In particular, a second sheet 302 of a metal foil laminate material is provided (step 507) and secured within the forming device 320, for example by clamping the second sheet 302 between the clamp elements 322, 325 (step 508). The second sheet 302 may be identical to the first sheet 301, or may have a different construction. In applications where the second sheet 302 is formed of a metal foil that is sandwiched between a polypropylene layer and a polyethylene layer, the polypropylene layer is arranged to face the punch.

Following the step of securing the second sheet 302 between the clamp elements 322, 325, the first punch 342 is provided by connecting it to the actuator (step 509). The second sheet 302 is then deformed by pressing the first punch 342 through the first and second central openings 324, 327 and against the second sheet 302 to form a wedge shaped initial recess 42i in the second sheet 302 (step 510). The initial recess 42i has the shape of the first protrusion 344, and thus has blunted or rounded edges and corners. In particular, the initial recess 42i has initial recess vertices 46i, 48i that have a radius corresponding to the first radius R1.

Following the step of deforming the second sheet 302 to form the initial recess 42i, the second punch 362 is provided by connecting it to the actuator (step 511). Next, the initial recess 42i of the second sheet 302 is further deformed by pressing the second punch 362 through the first and second central openings 324, 327 and against the second sheet 302 (step 512) to form a wedge shaped final recess 42f in the second sheet 302. The final recess 42f has the shape of the second protrusion 364, and thus has relatively sharp edges and corners. In particular, the final recess 42f has final recess vertices 46f, 48f that have a radius corresponding to the second radius R2.

As a result, the second case half 41(2) is formed that includes the wedge shaped recess 42 and the flange 80 that surrounds the wedge shaped recess 42 and protrudes outwardly therefrom.

Following formation of the first and second case halves 41(1), 41(2), the first and second case halves are assembled together (step 513). During assembly, the first and second case halves 41(1), 41(2) are oriented so that the flange 80 of the first case half 41(1) faces and abuts the flange 80 of the second case half 41(2), and so that the final recess vertices 46f, 48f and apex edge 50 of the first case half 41(1) are aligned with the trailing edge 56 of the second case half 41(2) in the direction of the stack axis 12. The recesses 42 of the assembled the first and second case halves 41(1), 41(2) form the housing 40 having the geometry of a rectangular prism.

The assembled first and second case halves 41(1), 41(2) are then joined together (step 514) by sealing the flange 80 of the first case half 41(1) to the flange 80 of the second case half 41(2) along a seal line 100. The seal line 100 is formed by application of heat to one or both of the flanges 80, and may be achieved, for example, by using by using a heat sealing device, welding, or other appropriate joining technique. The resulting seal line 100 surrounds the housing 40 including the wedge shaped recesses 42 of the first and second case halves 41(1), 41(2), whereby the seal line extends along a diagonal of a side of the rectangular prism-shaped housing 40. In some embodiments excess flange material (e.g., flange material disposed between the seal line and the case half peripheral edge) may be trimmed off.

In instances when the housing 40 is used to form the electrochemical cell, the electrode assembly 4 and an electrolyte are sealed within the interior space defined by the wedge-shaped recesses 42 of the first and second case halves 41(1), 41(2). Other ancillary components and features, including current collectors, terminals, etc. that may also be included in the cell 2 are well known in the art and not described here.

In the method described above, the first and second sheets may be formed of metal laminated film material that includes an aluminium film layer that is sandwiched between polymer layers. In some embodiments, when an aluminum laminated film material is used to form the case halves 41(1), 41(2), the central recess 42 of each of the first and second case halves 41(1), 41(2) are formed in a progressive forming process to a depth of greater than 10 mm. The maximum depth that can be achieved is a function of at least the size of the wedge, and, for the example of an aluminum laminated film used form a housing 40 having a 75 mm width and a 150 mm length, a depth of about 35 mm can be achieved.

In the method described above, one case half 41(1) is formed from a first sheet of a first material, and the counterpart case half 41(2) is formed of a second sheet of a second material, and the first material is the same as the second material. In other embodiments, the first material is different than the second material.

Although the material used in the illustrated embodiment to form a pouch cell is a flexible, three-layer, metal laminated film having a polypropylene layer, an aluminium foil layer, and a polyethylene layer, the material used to form the pouch cell may have a greater or fewer number of layers and/or use different materials to form the layers. In one example, some batteries that are used in cell phones employ a pouch cell housing that has the following three layers which are joined by a thin adhesive between adjacent layers: oriented nylon/aluminium foil/polypropylene. In another example, some batteries that are used in electric vehicles employ a pouch cell housing that has the following four layers which are joined by a thin adhesive between adjacent layers: polyethylene terephthalate/oriented nylon/aluminium foil/polypropylene.

Although the cells 20 are described herein as being lithium-ion cells, the cells 2 are not limited to having a lithium-ion chemistry. For example, the cells 2 may have other chemistries, including aluminum-ion, alkaline, nickel-cadmium, nickel metal hydride, or other appropriate chemistry.

In the illustrated embodiment, the positive electrodes 6, separators 8 and negative electrodes 10 are arranged in a stacked or layered configuration. It is understood, however, that the arrangement of the positive electrodes 6, separators 8 and negative electrodes 10 is not limited to a stacked configuration. For example, the positive electrodes 6, separators 8 and negative electrodes 10 may be provided in a Z-folded configuration, a rolled and flattened configuration, a cross-woven configuration, or any other suitable configuration.

In the illustrated embodiment, the method is used to form a pouch cell housing 40 of a battery cell 2. It is understood, however, that the method may be used to form other products and/or packaging that requires a reliable seal, including, but not limited to, packaging for food.

In the method described herein, two separate blanks of sheet material are used, and each blank is used to form a single case half that are subsequently assembled together. It is understood, however, that a single, larger blank of sheet material can be used to form two case halves, and that the two case halves can be assembled by appropriate folding of the larger blank.

Selective illustrative embodiments of the apparatus and method are described above in some detail. It should be understood that only structures considered necessary for clarifying the apparatus and method have been described herein. Other conventional structures, and those of ancillary and auxiliary components of the apparatus and method, are assumed to be known and understood by those skilled in the art. Moreover, while working examples of the apparatus and method have been described above, the apparatus and/or method is not limited to the working examples described above, but various design alterations may be carried out without departing from the devices as set forth in the claims.

What is claimed is:

1. A method of forming a housing, the method comprising providing a first sheet of a metal foil laminate material;
clamping the first sheet between a first clamping surface of a first clamp element and a second clamping surface of a second clamp element, the first clamp element having a first central opening formed in the first clamping surface and the second clamp element having a second central opening formed in the second clamping surface, the first central opening and the second central opening being aligned along a clamping axis that is perpendicular to both the first clamping surface and the second clamping surface;
providing a first punch that comprises a first base configured to be connected to an actuator, and a first protrusion that protrudes from the first base and has the shape of a right triangular prism, the first protrusion including two first vertices that are spaced apart from the first base and form a leading edge of the first protrusion, each of the two first vertices having a first radius;
deforming the first sheet of material by pressing the first punch through the first central opening and the second central opening and against the first sheet to form a wedge shaped recess in the first sheet having recess vertices that have a radius corresponding to the first radius;
providing a second punch that comprises a second base configured to be connected to an actuator, and a second protrusion that protrudes from the second base and has the shape of a right triangular prism, the second protrusion including two second vertices that are spaced apart from the second base and form a leading edge of the second protrusion, each of the two second vertices having a second radius that is smaller than the first radius; and
deforming the wedge shaped recess by pressing the second punch through the first central opening and the second central opening and against the first sheet to deform the wedge shaped recess such that the recess vertices have a radius corresponding to the second radius, whereby a first case half is formed that includes the wedge shaped recess and a first flange that surrounds the wedge shaped recess and protrudes outwardly therefrom.

2. The method of claim 1, further comprising the following method steps:
providing a second sheet of a metal foil laminate material;
clamping the second sheet between the first clamping surface of the first clamp element and the second clamping surface of the second clamp element;
deforming the second sheet of material by pressing the first punch through the first central opening and the second central opening and against the second sheet to form a wedge shaped recess in the second sheet having recess vertices that have a radius corresponding to the first radius; and
deforming the wedge shaped recess by pressing the second punch through the first central opening and the second central opening and against the second sheet to deform the wedge shaped recess such that the recess vertices have a radius corresponding to the second radius, whereby a second case half is formed that includes the wedge shaped recess and a second flange that surrounds the wedge shaped recess and protrudes outwardly therefrom.

3. The method of claim 2, further comprising the following method steps:
assembling the first sheet and second sheet together such that wedge shaped recess of the of the first sheet cooperates with the wedge shaped recess of the second sheet to form the housing having an interior space that has the shape of a rectangular prism, and
sealing the first flange to the second flange along a seal line that surrounds both the wedge shaped recess of the of the first sheet and the wedge shaped recess of the second sheet, whereby the seal line extends along a diagonal of a side of the rectangular prism.

4. The method of claim 3 wherein the step of sealing the first flange to the second flange is performed by applying heat to at least one of the first and second flanges.

5. The method of claim 1, wherein the first clamp element and the second clamp element are clamped together using a clamping force applied along the clamping axis that is sufficient to retain the first sheet between the first clamp element and the second clamp element during the deforming step, while also allowing the first sheet to slide relative to the first clamping surface and the second clamping surface.

6. The method of claim 1, wherein the first radius is at least 10 mm and the second radius is at most 4 mm.

7. The method of claim 1, wherein the first radius is in a range of 10 mm to 15 mm, and the second radius is in a range of 1 mm to 4 mm.

* * * * *